United States Patent
Herbst et al.

(10) Patent No.: US 11,561,982 B2
(45) Date of Patent: Jan. 24, 2023

(54) INTELLIGENT AND AUTOMATIC EXCEPTION HANDLING

(71) Applicant: SAP SE, Walldorf (DE)

(72) Inventors: Axel Herbst, Eppingen (DE); Knut Manske, Oftersheim (DE)

(73) Assignee: SAP SE, Walldorf (DE)

( * ) Notice: Subject to any disclaimer, the term of this patent is extended or adjusted under 35 U.S.C. 154(b) by 395 days.

(21) Appl. No.: 16/795,393

(22) Filed: Feb. 19, 2020

(65) Prior Publication Data
US 2021/0256028 A1    Aug. 19, 2021

(51) Int. Cl.
| | | |
|---|---|---|
| *G06F 17/00* | (2019.01) | |
| *G06F 7/00* | (2006.01) | |
| *G06F 16/2455* | (2019.01) | |
| *G06F 16/28* | (2019.01) | |
| *G06F 16/242* | (2019.01) | |
| *G06Q 10/06* | (2012.01) | |

(52) U.S. Cl.
CPC .... *G06F 16/24565* (2019.01); *G06F 16/2425* (2019.01); *G06F 16/284* (2019.01); *G06Q 10/063* (2013.01)

(58) Field of Classification Search
CPC .......... G06F 16/24565; G06F 16/284; G06F 16/2425; G06Q 10/063
USPC ...................................................... 707/702
See application file for complete search history.

(56) References Cited

U.S. PATENT DOCUMENTS

| | | | | | |
|---|---|---|---|---|---|
| 5,649,225 A | * | 7/1997 | White | ................ | G06F 9/3824 712/E9.034 |
| 6,038,516 A | * | 3/2000 | Alexander | ............. | H02H 3/04 715/810 |
| 6,378,087 B1 | * | 4/2002 | Flanagan | ............ | G06F 11/3672 714/E11.212 |
| 7,499,922 B1 | * | 3/2009 | Shiverick | ................ | G06F 9/451 707/999.007 |
| 9,922,078 B2 | * | 3/2018 | Shiverick | ............ | G06F 16/2425 |
| 10,599,558 B1 | * | 3/2020 | Zana | ...................... | G06F 11/302 |
| 2003/0084269 A1 | * | 5/2003 | Drysdale | ................ | G06F 9/544 712/36 |

(Continued)

OTHER PUBLICATIONS

"Communication—European Search Report" from the European Patent Office for European Application No. EP20213355.9-1222, dated May 25, 2021, 8 pages.

(Continued)

*Primary Examiner* — Pavan Mamillapalli

(74) *Attorney, Agent, or Firm* — Klarquist Sparkman, LLP

(57) ABSTRACT

In a database environment including a plurality of logical object definitions having relationships defined according to a schema, and logical object instances following the logical object definitions include attribute names and respective attribute values indicating status of an enterprise in an enterprise resource planning system, the method can receive a starting exception definition specifying a first query against the logical object instances and derive a new exception definition based on the starting exception definition and one or more stored, acted-upon exception definition proposals. The first query can include one or more initial situational trigger conditions. The new exception definition can specify a second query against the logical object instances and the second query can include one or more modified situational trigger conditions.

20 Claims, 10 Drawing Sheets

(56) References Cited

U.S. PATENT DOCUMENTS

| | | | |
|---|---|---|---|
| 2005/0209876 A1* | 9/2005 | Kennis | G06Q 10/06393 |
| | | | 726/1 |
| 2015/0106165 A1 | 4/2015 | Rai et al. | |
| 2017/0123632 A1 | 5/2017 | Latzina et al. | |
| 2017/0177702 A1* | 6/2017 | Manske | G06F 16/24575 |
| 2017/0178000 A1 | 6/2017 | Manske et al. | |
| 2018/0095651 A1 | 4/2018 | Manske et al. | |
| 2019/0073636 A1 | 3/2019 | Manske et al. | |
| 2019/0138191 A1 | 5/2019 | Latzina et al. | |

OTHER PUBLICATIONS

NoSQL, Wikipedia, https://en.wikipedia.org/wiki/NoSQL, 12 pages, Feb. 18, 2020.

* cited by examiner

INTELLIGENT AND AUTOMATIC EXCEPTION HANDLING

BACKGROUND

Enterprise software generally maintains a database environment that can include a plurality of database tables. Users of the enterprise software can run queries against the database tables. Such queries can retrieve objects from the database tables that satisfy conditions predefined in the queries. While queries based on predefined conditions can be helpful in a business environment to identify when certain business processes may need human intervention, there remains a need for more intelligent queries that can automatically define new conditions that are adaptive to the changing business status, instead of relying on predefined conditions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments of the disclosure concern a computer-implemented method. In a database environment including a plurality of logical object definitions having relationships defined according to a schema, and logical object instances following the logical object definitions include attribute names and respective attribute values indicating status of an enterprise in an enterprise resource planning system, the method can include receiving a starting exception definition specifying a first query against the logical object instances, the first query including one or more initial situational trigger conditions. The method can further include deriving a new exception definition based on the starting exception definition and one or more stored, acted-upon exception definition proposals. The new exception definition can specify a second query against the logical object instances. The second query can include one or more modified situational trigger conditions.

In certain embodiments, the method can further include detecting a user action in response to at least one logical object instance that satisfies the second query. When the user action is detected for a predetermined number of times, the new exception definition can be categorized as an acted-upon exception definition proposal.

In certain embodiments, deriving the new exception definition can include re-using a data context associated with at least one of the one or more stored, acted-upon exception definition proposals. The data context can include attribute names and attribute values corresponding to the attribute names.

In certain embodiments, re-using the data context can include copying or modifying at least one of the attribute names or attribute values.

In certain embodiments, the one or more initial situational trigger conditions in the first query can include an original first situational trigger condition that specifies a comparison between a first attribute of a primary logical object definition and an original first reference value. The primary logical object definition can be one of the plurality of logical object definitions in the database environment.

In certain embodiments, deriving the new exception definition can include changing the original first situational trigger condition to a modified first situational trigger condition which specifies a comparison between the first attribute of the primary logical object definition and a modified first reference value. The original first reference value can define an initial scope of the first attribute, the modified first reference value can define a modified scope of the first attribute, and the modified scope of the first attribute can be broader than the initial scope of the first attribute.

In certain embodiments, the one or more modified situational trigger conditions in the first query can include an original second situational trigger condition that operates in conjunction with the original first situational trigger condition. The original second situational trigger condition can specify a comparison between a second attribute selected from the plurality of logical object definitions and an original second reference value. Deriving the new exception definition can include changing the original second situational trigger condition to a modified second situational trigger condition which specifies a comparison between the second attribute and a modified second reference value. The original second reference value can define an initial scope of the second attribute, the modified second reference value can define a modified scope of the second attribute, and the initial scope of the second attribute can be broader than the modified scope of the second attribute.

In certain embodiments, deriving the new exception definition can include defining a second situational trigger condition that operates in conjunction with the modified first situational trigger condition. Defining the second situational trigger condition can include selecting a second attribute of the primary logical object definition and determining a second reference value to which the second attribute is compared.

In certain embodiments, deriving the new exception definition can include defining a second situational trigger condition that operates in conjunction with the modified first situational trigger condition. Defining the second situational trigger condition can include selecting an attribute of a secondary logical object definition and determining a second reference value to which the attribute is compared. The secondary logical object definition can be directly related to the primary logical object definition by at least one shared attribute.

In certain embodiments, deriving the new exception definition can include defining a second situational trigger condition that operates in conjunction with the modified first situational trigger condition. Defining the second situational trigger condition can include selecting an attribute of a secondary logical object definition and determining a second reference value to which the attribute is compared. The secondary logical object definition can be directly related to the primary logical object definition by any shared attribute. The attribute of the secondary logical object definition can be semantically associated with at least one attribute of the primary logical object definition.

In certain embodiments, the method can further include, responsive to detecting satisfaction of the second query against the logical object instances, sending a message from a first computer to a second computer indicating that the one or more modified situational trigger conditions have been met.

Certain embodiments of the disclosure also concern a system including one or more processors and memory coupled to the one or more processors comprising instructions causing the one or more processors to perform a method. In a database environment including a plurality of logical object definitions having relationships defined according to a schema, and logical object instances following the logical object definitions include attribute names and respective attribute values indicating status of an enterprise in an enterprise resource planning system, the method can include receiving a starting exception definition specifying a first query against the logical object instances. The first query can include one or more initial situational trigger conditions. The method can further include deriving a new exception definition based on the starting exception definition and one or more stored, acted-upon exception definition proposals. The new exception definition can specify a second query against the logical object instances. The second query can include one or more modified situational trigger conditions.

In certain embodiments, the method can further include detecting a user action in response to at least one logical object instance that satisfies the second query. When the user action is detected for a predetermined number of times, the new exception definition can be accepted as an acted-upon exception definition proposal.

In certain embodiments, deriving the new exception definition can include re-using a data context associated with at least one of the one or more stored, acted-upon exception definition proposals. The data context can include attribute names and attribute values corresponding to the attribute names.

In certain embodiments, the one or more initial situational trigger conditions in the first query can include an original first situational trigger condition that specifies a comparison between a first attribute of a primary logical object definition and an original first reference value. The primary logical object definition can be one of the plurality of logical object definitions in the database environment.

In certain embodiments, deriving the new exception definition can include changing the original first situational trigger condition to a modified first situational trigger condition which specifies a comparison between the first attribute of the primary logical object definition and a modified first reference value. The original first reference value can define an initial scope of the first attribute, the modified first reference value can define a modified scope of the first attribute, and the modified scope of the first attribute can be broader than the initial scope of the first attribute.

In certain embodiments, the one or more modified situational trigger conditions in the first query can include an original second situational trigger condition that operates in conjunction with the original first situational trigger condition. The original second situational trigger condition can specify a comparison between a second attribute selected from the plurality of logical object definitions and an original second reference value. Deriving the new exception definition can include changing the original second situational trigger condition to a modified second situational trigger condition which specifies a comparison between the second attribute and a modified second reference value. The original second reference value can define an initial scope of the second attribute, the modified second reference value can define a modified scope of the second attribute, and the initial scope of the second attribute can be broader than the modified scope of the second attribute.

In certain embodiments, deriving the new exception definition can include defining a second situational trigger condition that operates in conjunction with the modified first situational trigger condition. Defining the second situational trigger condition can include selecting a second attribute of the primary logical object definition and determining a second reference value to which the second attribute is compared.

In certain embodiments, the method can further include, responsive to detecting satisfaction of the second query against the logical object instances, sending a message from a first computer to a second computer indicating that the one or more modified situational trigger conditions have been met.

Certain embodiments of the disclosure further concern one or more computer-readable media having encoded thereon computer-executable instructions causing one or more processors to perform a method. In a database environment including a plurality of logical object definitions having relationships defined according to a schema, and logical object instances following the logical object definitions comprise attribute names and respective attribute values indicating status of an enterprise in an enterprise resource planning system, the method can include receiving a starting exception definition specifying a first query against the logical object instances. The first query can include one or more initial situational trigger conditions. The method can also include deriving a new exception definition based on the starting exception definition and one or more stored, acted-upon exception definition proposals. The new exception definition can specify a second query against the logical object instances. The second query can include one or more modified situational trigger conditions. Responsive to detecting satisfaction of the second query against the logical object instances, the method can further include sending a message from a first computer to a second computer indicating that the one or more modified situational trigger conditions have been met. The method can further include detecting a user action in response to at least one logical object instance that satisfies the second query. When the user action is detected for a predetermined number of times, the new exception definition can be accepted as an acted-upon exception definition proposal.

The foregoing and other objects, features, and advantages will become more apparent from the following detailed description, which proceeds with reference to the accompanying figures.

DETAILED DESCRIPTION

Example 1—Overview of Exception Detection in an Enterprise Resource Planning System Enterprise resource planning (ERP) systems allow an organization to use integrated software applications to manage the business and automate many back-office functions related to technology, services and human resources. ERP software typically integrates day-to-day processes of an enterprise (for example, order-to-cash, source-to-contract, procure-to-pay, plan-to-product, and request-to-service, hire-to-retire, etc.) and core capabilities in a single database, application and user interface. Such processes may not always run ideally. When deviations or exceptions of the processes occur, human intervention may be needed. Examples of human intervention include replacing an unreliable supplier, ordering additional raw material, notifying a debtor to pay, etc. Defining such exceptional situations (hereinafter referred to "exceptions") that require user's attention can be time consuming and expensive. This is because such definitions conventionally require the involvement of a power user who is an expert of the ERP system. To define what constitute exceptions, the power user needs to know what logical objects to observe, identify which attributes and values are critical, and formalize such expert knowledge into machine-readable queries. As such, not only can the manual process of exception definition be tedious, but also the user-defined exception definitions can be under-inclusive such that many issues that should be alerted to end users are not detected.

Thus, it would be advantageous for an improved ERP system to monitor the system status and automatically detect exceptions. Further, it would be advantageous for the ERP software to propose actions, or even automatically apply proper actions, to resolve the detected exceptions. In the following, we describe a method for intelligent and automatic exception handling in an ERP system. Such intelligent and automatic exception handling (also referred to as "situation handling") technologies can be applied across a wide variety of enterprise software environments. As described herein, machine learning techniques can be integrated so that increasingly intelligent exception handling is achieved.

Example 2—Example Overview of the Exception Handling System

Figure 1:
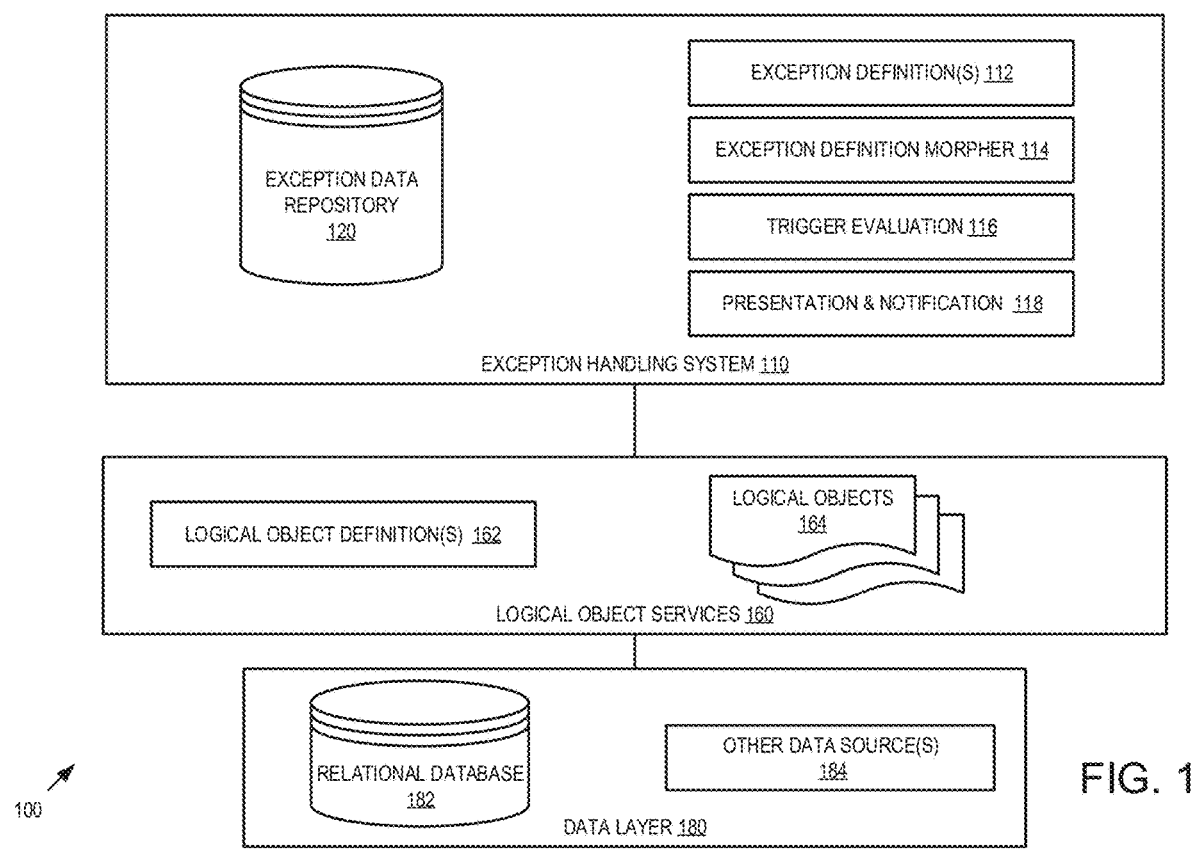
FIG. 1 is an overall block diagram of an example exception handling system interacting with logical object services and data layer based on the described technologies.

FIG. 1 shows an overall block diagram 100 of an example exception handling system 110 and its relationship with logical object services 160 and a data layer 180 implemented in an ERP system, according to one embodiment of the disclosed subject matter.

The data layer 180 can include a relational database 182 that stores business data. The relational database 182 can organize business data into one or more tables of rows and columns, with a unique key for each row. Rows in one table can be linked to rows in other tables by storing the unique key of the row to which it should be linked thus representing relationships existing both among the columns within a table and among the tables. The business data stored in the relational database 182 can include accounting data, inventory data, supply chain data, human resource data, among others. The data layer 180 can also include other data resources 184 that are stored separate from or in the alternative to the relational database 182. Such other data resources 184 can include text files with or without meta data, image files, audio/video data, online analytical processing data, databases with non-relational data modeling, etc.

As shown, the ERP system can maintain logical object services 160 that interact with the data layer 180. The logical object services 160 can function as an abstract layer of the data layer 180 such that users of the ERP system can access data stored in the data layer 180 via a simplified object-oriented interface implemented in the logical object services 160.

In some embodiments, the logical object services 160 can include a plurality of logical object definitions 162. Such logical object definitions 162 can represent different types of business objects in a business, such as contract, vendor, supplier, product, order, etc. In an example embodiment, each logical object definition can have one or more attributes. For example, a logical object definition representing contracts can include attributes such as contract ID, expiration date of the contract, name of the person signing the contract, product specified in the contract, volume of the product, unused amount of the products, etc. In another example, a logical object definition representing suppliers can include attributes such as company name, company address, contract ID, supplied product, delivery time, etc. In yet another example, a logical object definition representing orders can include attributes such as order ID, delivery date, the name of ordering party, and the order quantity.

In some embodiments, some of the logical object definitions 162 can be related to each other according to a schema. For example, the logical object definition representing the contract can be directly related to the logical object definition representing the suppliers through the shared attribute "contract ID." In some embodiments, some of the logical object definitions may not be directly related to other logical object definitions. For example, an unrelated logical object definition may not share a common attribute with other logical object definitions.

The logical object services 160 can further include a plurality of logical objects 164, which are instances of the respective logical object definitions 162. For example, one or more contract objects can be instantiated based on the logical object definition representing contracts, one or more supplier objects can be instantiated based on the logical object definition representing suppliers, and so on. Each instantiated logical object can include names of the attributes as defined in the corresponding logical object definition and corresponding attribute values that indicate status of the business. For example, in a supplier object, one of the attribute names can be a text string "Address" and the corresponding attribute value can be a text string describing the actual mailing address of the company. In another example, in a contract object, one of the attribute names can be a text string "Volume" and the corresponding attribute value can be a numerical value (e.g., 100,000) representing the number of products specified in the contract.

The exception handling system 110 can be configured to interface with the logical object services 160. The exception handling system 110 can include exception definitions 112, an exception definition morpher 114, a trigger evaluation unit 116, a presentation and notification unit 118, and an exception data repository 120.

The exception definitions 112 can define exceptions (sometimes called "situations") that potentially warrant user attention, e.g., a new supplier contract is created that can accept internal orders, the inventory of a product is low, etc. Specifically, the exception definitions 112 can include queries that run against the logical objects 164 maintained by the logical object services 160. As described more fully below, the queries can include one or more situational trigger conditions, which can be evaluated by the trigger evaluation unit 116.

Some of the exception definitions 112 can be originally predefined by a user. As described more fully below, some of the exception definitions 112 can be automatically derived from those predefined exception definitions by the exception definition morpher 114.

Logical objects 164 that satisfy the queries can be detected and stored in an exception data repository 120. Other application and situational data related to the detected logical objects satisfying the queries can also be stored in the exception data repository 120 for data analysis, machine learning, and/or business reporting purposes.

After detecting satisfaction of the queries against the logical objects, the presentation and notification unit 118 can send a message to a message handling unit indicating that certain situational trigger conditions have been met. In some embodiments, the message handling unit can be located in the same computer where the exception handling system resides. In some embodiments, the message handling unit can be located remotely from the computer where the exception handling system resides. For example, the message handling unit may be located on a central server of an ERP system or on a terminal computer that is remotely connected to the central server of the ERP system. The presentation and notification of such messages allow users to provide feedback to the exception handling system 110, as described more fully below.

In some embodiments, the exception definitions 112 can further include references to actions associated with the detected exceptions. After detecting satisfaction of the queries against the logical objects, the associated actions can be presented or recommended to the user, who may choose to select and execute the actions, or alternatively, specify different actions.

In some embodiments, the generated exception definitions 112 can be ranked, optimized and improved over time via run time monitoring and user feedback.

Example 3—Example Logical Objects

In any of the examples herein, a logical data object (sometimes called a "logical object") can take the form of an instantiation of a logical object definition having one or more attributes (e.g., fields having a data type). The instantiated logical object can have values for respective of the fields. In practice, the logical object can also have associated functionality (e.g., methods) and exhibit object-oriented characteristics such as encapsulation, polymorphism, inheritance, and the like. A logical object can represent a real-world item such as an employee, warehouse, contract, supplier, or the like.

Example 4—Example Exception Definitions

Figure 2:
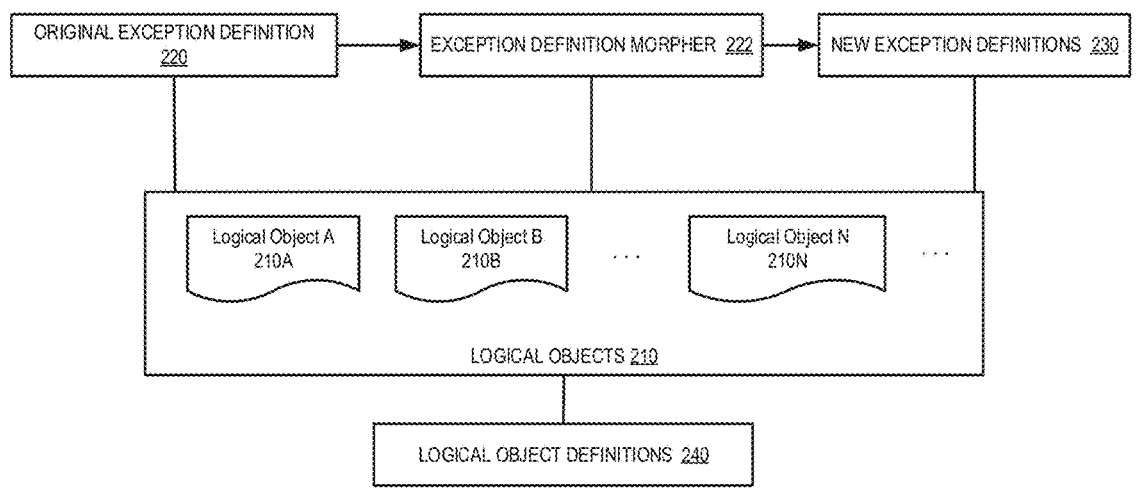
FIG. 2 is a block diagram illustrating the relationship between the exception definitions, the logical objects and logical object definitions.

FIG. 2 is a block diagram 200 illustrating the relationship between the exception definitions 220, 230, the logical objects 210, and the logical object definitions 240.

As described above, the logical object definitions 240 can represent different types of business objects, each of which can have one or more attributes. A plurality of logical objects 210A, 210B, ..., 210N, etc. (collectively 210) can be instantiated based on the logical object definitions 240, and each logical object can include names of the attributes and the corresponding attribute values.

One or more original exception definitions 220 can be predefined by a user. Such original exception definitions 220 can include predefined queries against the logical objects 210 to detect exceptions. Each predefined query can include one or more predefined situational trigger conditions, the satisfaction of which can return logical objects 210 that would require actions by one or more users who are associated with the detected exceptions. The predefined situational trigger conditions can include comparisons between attributes and respectively predefined attribute values. In other words, running the predefined query involves testing the predefined situational trigger conditions by comparing the attributes and respectively predefined attribute values, the satisfaction of which would return the exceptions.

The exception definition morpher 222 can automatically derive new exception definitions 230 from the original exception definitions 220. Instead of relying on predefined queries comprising predefined situational trigger conditions, the new exception definitions 230 can include new queries comprising new situational trigger conditions. Thus, the new exception definitions 230 can detect additional exceptions in the logical objects 210 that otherwise would not be detected by the original exception definitions 220. The capability of detecting such additional exceptions by the new exception definitions 230 allows the ERP system to be more adaptive to the changing business status, compared to a static ERP system where the exception definitions are predefined.

Figure 3:
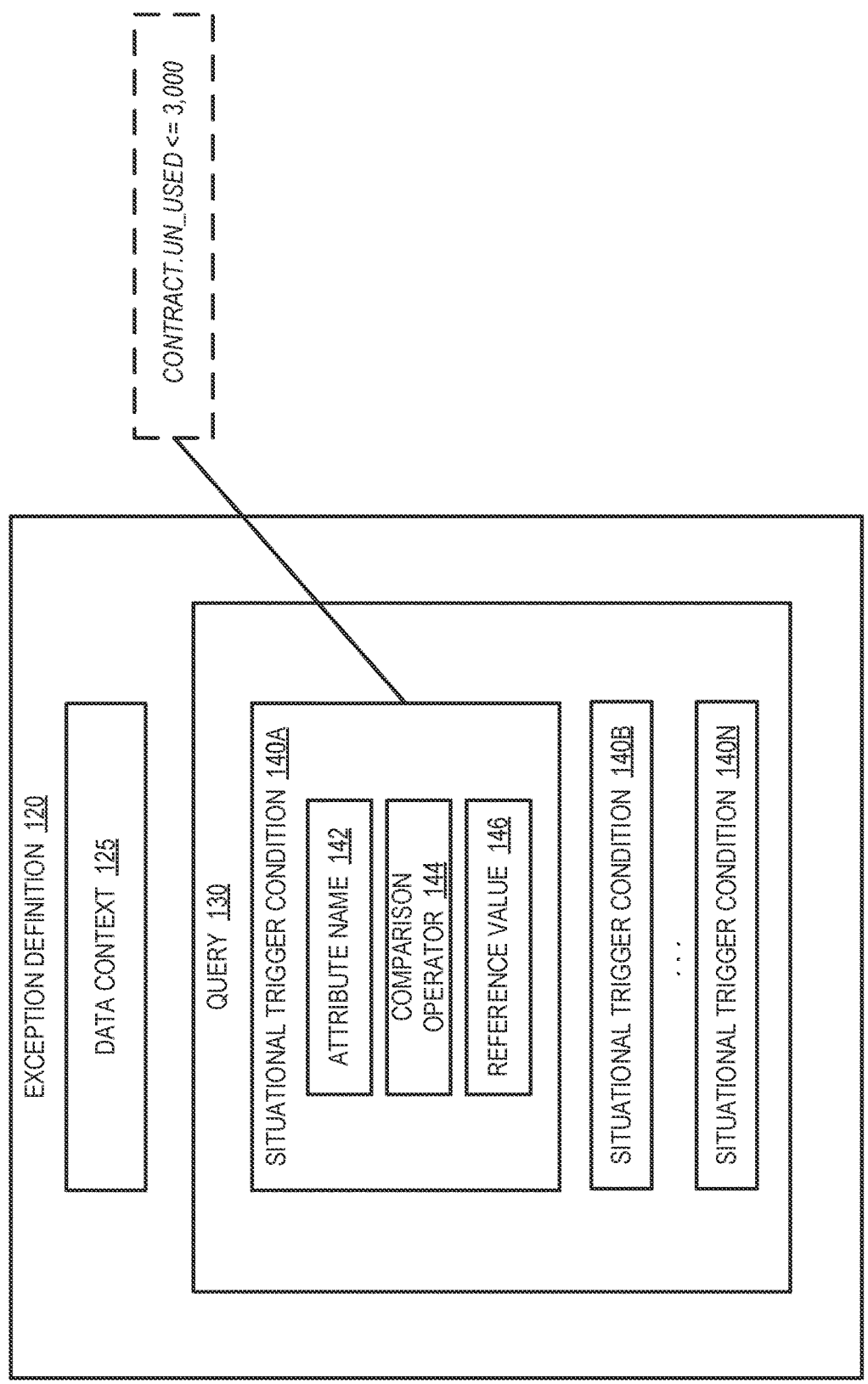
FIG. 3 is a diagram illustrating the structure of an example exception definition.

FIG. 3 is a diagram 300 illustrating the structure of an example exception definition 320, which can be an original exception definition predefined by a user or automatically generated based on the original exception definition.

In the depicted example, the exception definition 320 includes a query 330 that includes a situational trigger condition 340A, which specifies a comparison between an attribute and a corresponding reference value. In the depicted example, the situation trigger condition 340A includes a Boolean expression specified by an attribute name 342, a comparison operator 344, and a reference value 346. The attribute name 342 can specify an attribute of a logical object. The comparison operator 344 can include, but is not limited to, any of the following operators: $=$ (equal to), $<>$ (not equal to), $>$ (greater than), $<$ (less than), $\Rightarrow$ (greater than or equal to), $\Leftarrow$ (less than or equal to), $\subseteq$ (subset of), $\supseteq$ (superset of), etc. Logical expressions and mathematical formulas can also be included. The reference value 346 can specify a value against which the attribute (specified by the attribute name 342) is compared (using the comparison operator 344). For example, one example Boolean expression can be "CONTRACT.UN_USED$\Leftarrow$3,000," where "UN_USED" is the attribute name 342 specified in the CONTRACT logical objects, "$\Leftarrow$" (less than or equal to) is the comparison operator, and "3,000" is the reference value. Thus, the situational trigger condition specified by such Boolean expression is satisfied whenever the volume of unused parts in a contract object is less than or equal to 3,000.

In some embodiments, the query 330 can include a plurality of situational trigger conditions (e.g., 340A, 340B, 340N, etc.), each of which can include a Boolean expression that specifies a comparison between an attribute and a corresponding reference value. In some embodiments, an exception can be generated when the situational trigger conditions are satisfied.

In some embodiments, a query can be constructed using a query builder tool that stores situational trigger conditions, including the respective attribute names, the comparison operators, and the reference values. The attribute names used in defining situational trigger conditions can be stored in and drawn from a separate data context that defines a set of attributes which users usually consider as basis for their decisions.

Although the term "exception" is used, it should be noted that the technology is not exclusively directed to finding outliers in data, but rather can also detect categorical similarities and provide solutions that meet user intent. The goal of meeting intent can be achieved taking user behavior into account as described herein.

Example 5—Example Data Context

In any of the examples herein, an exception definition 320 can be associated with a data context 325. Although shown as part of the exception definition 320, the data context 325 can be stored outside of the definition 320 and merely be associated with it. Such a data context 325 can comprise the set of attributes involved in decision making (e.g., without comparison operators or reference values).

A set of initial values can be assigned to the attributes in the data context. In some embodiments, the values stored in the data context can be captured by observing positive evaluation of the exception definition and for actions related to the detected exceptions. Capturing observed data contexts acted upon by users can lead to a series of stored captured data contexts that can be used to influence future exception definition construction.

Example 6—Example Overall Method of Generating New Exception Definitions

Figure 4:
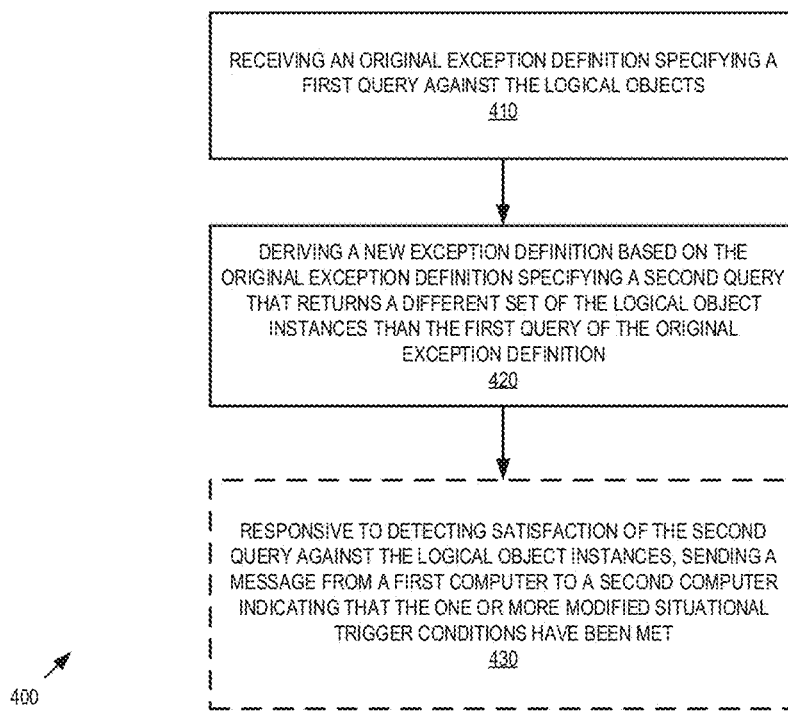
FIG. 4 is a flowchart illustrating an example overall method of generating a new exception definition based on an original exception definition.

FIG. 4 is a flowchart 400 illustrating an example overall method of generating new exception definitions based on starting exception definitions (e.g., original exception definitions predefined by a user or a prior exception definition proposal).

At 410, the exception handling system can receive a starting exception definition (e.g., predefined by the user). The original exception definition can specify a first query against the logical objects. The first query can include one or more initial situational trigger conditions as described above.

At 420, the exception handling system can derive a new exception definition based on the starting exception definition. As described herein, the new exception definition can also be based on one or more stored, acted-upon prior exception definition proposals (e.g., elements from such proposals). The new exception definition can specify a second query against the logical object instances that returns a different set of the logical object instances than the first query of the original exception definition. The second query can include one or more modified situational trigger conditions.

Over time, new exception definitions can be used as prior exception definition proposals, and further new exception definitions can be generated based on whether the new exception definitions are categorized as acted upon by users. As such, the system can converge on a useful set of exception definitions tailored to the behavior of the users and the context of current conditions. In today's ever-changing computing environment, the system can continue to evolve over time as the context and user behavior changes over time, thereby providing a superior set of exception definitions that address current conditions, rather than a stale set of exception definitions.

In practice, the new exception definition can be stored in a database of other exception definitions that a computing system automatically periodically runs against the logical object instances to detect exceptions.

Subsequently, upon deployment, at 430, responsive to detecting satisfaction of the second query against the logical object instances, the exception handling system can send a message from a first computer to a second computer indicating that the one or more modified situational trigger conditions have been met. In some embodiments, the exception handling system is located on the first computer, and the second computer is configured to receive user feedback on the detected exceptions.

Example 7—Example Method of Automatic Exception Handling

Figure 5:
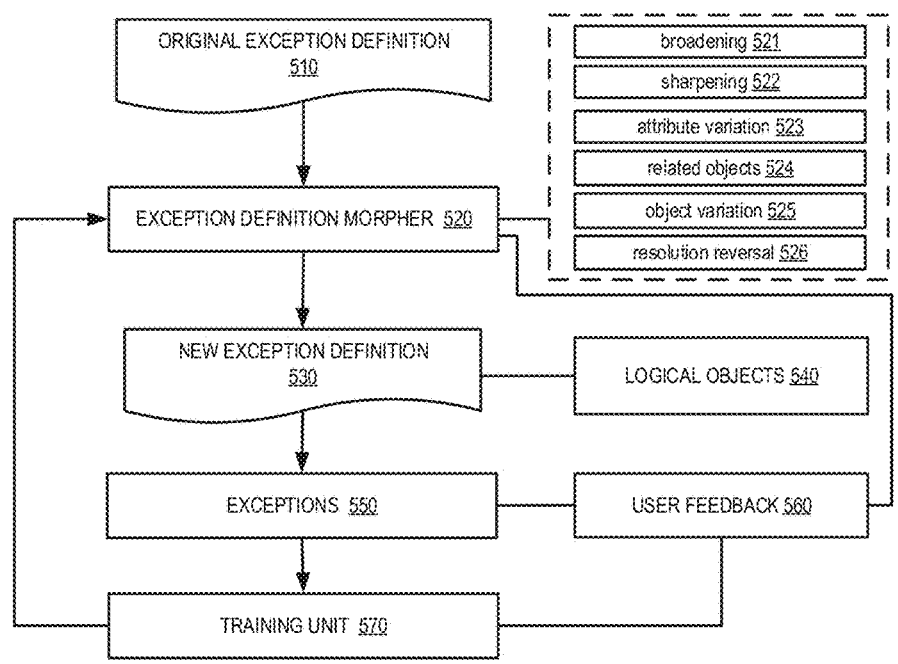
FIG. 5 is a flowchart illustrating an example overall method of automating the exception handling process.

FIG. 5 a flowchart 500 illustrating an example overall method of automating the exception handling process.

As shown, an exception definition morpher 520 can receive the predefined original exception definition 510 as an input and generate a new exception definition 530 as its output. The exception definition morpher 520 can be configured to implement any one or more of the following morphing methods: broadening 521, sharpening 522, attribute variation 523, related objects 524, object variation 525, and resolution reversal 526, as described more fully below.

In some embodiments, the input of the exception definition morpher 520 can also include historical or captured data contexts (including data context values and actions related to the exceptions). For example, assume a "contract expiring" exception evaluates the "contract date−current date<30 days." If this is satisfied (i.e., the contract date is less than 30 days from today's date), an exception is generated. The data context for this exception type can include attribute names such as material group, region, plant, etc. With each creation or modification of the "contract expiring" exception, a corresponding data context (with a set of data context values) can be written.

The exception definition morpher 520 can recognize which (discrete) data context values for the respective attributes have been captured and for which attribute value combinations, the user reacted, and in which manner (e.g., which action the user took). Such information can contribute to the "user feedback" 560 as described below, and show the value of a proposal.

If an exception is not picked up by the user or if no action is taken after being inspected by the user, the exceptions may represent little value or urgency for the user. This usually varies with the attribute values (e.g., one material group "engine parts" may be more critical than others "office material").

Applying the new exception definition 530 to the logical objects can detect exceptions 550 (i.e., instances of logical objects that satisfy the queries specified in the new exception definitions 530). The detected exceptions 550, as well as other application and situational data related to the exceptions can be stored in the exception data repository 120 as depicted in FIG. 1.

In practice, a plurality of original exception definitions can be employed, and any of them can result in one or more new exception definitions.

In some embodiments, the detected exceptions 550 may be deemed as merely candidate exceptions which are not visible to users of the ERP system. Instead, such candidate exceptions are mainly monitored by the ERP system and collected in the exception data repository for data analysis, machine learning, and/or data reporting purposes. For example, the ERP system may include an exception simulator that is configured to apply different morphing methods to generate various sets of new exception definitions, based on which to query the logical objects to generate a plurality of candidate exceptions. In some embodiments, the exception simulator can be configured to estimate or measure, and optionally rank the resource consumption of applying the new exception definitions (e.g., how many logical objects are processed and how many candidate exceptions are detected, how long is the querying time, how much memory needs to be allocated for executing the queries, etc.). Such estimate or measurement of the resource consumption can be used to limit the scope of various morphing methods employed by the exception definition morpher 520.

In some embodiments, through a feedback application, the detected exceptions 550 can be presented to an advanced user (e.g., an expert who has a more advanced grasp of handling exceptional situations than regular end users) of the ERP system to receive feedback. The user feedback 560 can include assessment and/or ranking on the effectiveness of the generated new exception definitions 530. The user feedback 560 can also include user's choices (e.g., acceptance or rejection) for the detected exceptions as well as annotations (e.g., explaining the rational) associated with the user's choices. The accepted exceptions can be made visible, whereas the rejected exceptions can be made invisible to regular end users of the ERP system. Thus, the user feedback can improve the usability of the exception handling system by ensuring only meaningful exceptions are presented to regular end users. In some embodiments, the user feedback can further include the advanced user's assessment of the overall business impact of adopting the new exception definitions 530.

In some embodiments, the detected exceptions 550 and the user feedback 560 can be fed into a training unit 570, which is adapted to synthesize a rule that can predict the user feedback 560 in response to the detected exceptions 550. For example, after a sufficiently large volume of data pertaining to the detected exceptions 550 and the corresponding user feedback 560 are collected, the training unit 570 can use a machine learning algorithm to synthesize a rule that predicts the power user's choices (e.g., acceptance or rejection) for the detected exceptions 550. Thus, over time, the training unit 570 can use the synthesized rule to automate the exception handling process by reducing or even eliminating the need of user feedback 560 for detected exceptions 550.

In some embodiments, the rule synthesized by the training unit 570 can be fed back to the exception definition morpher 520 and affect the morphing methods 521-526 of generating new exception definitions 530. For example, if the rule indicates that most exceptions detected by a new exception definition are rejected, the morphing method(s) that generate such new exception definition can be disfavored or discarded by the exception definition morpher 520. On the other hand, if the rule indicates that most exceptions detected by a new exception definition are accepted, the morphing method(s) that generate such new exception definition can be favored or retained by the exception definition morpher 520.

Example 8—Example Increasingly Intelligent Exception Handling

Figure 6:
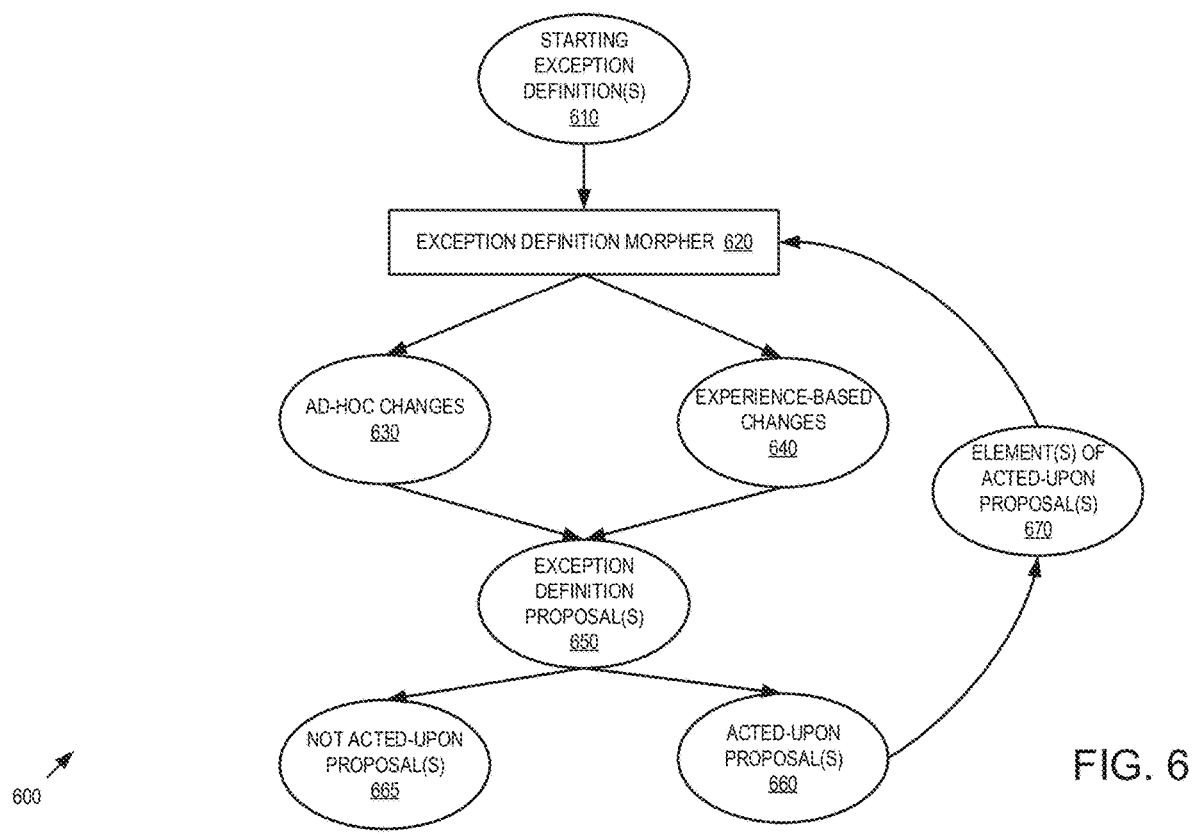
FIG. 6 is a data flow diagram showing how increasingly intelligent exception handling can be implemented.

FIG. 6 is a data flow diagram showing how increasingly intelligent exception handling can be implemented. In the example, one or more starting exception definitions 610 are morphed by the exception definition morpher 620 into one or more exception definition proposals 650. Such starting exception definitions 610 can be original exception definitions or accepted proposals (e.g., generated by the morpher 620). When accepted proposals are used as a basis for further proposals 650, a feedback loop can lead to increasingly intelligent exception handling.

Such proposals 650 can be based on ad-hoc changes 630 (e.g., generated "in the dark" without respect to experience), experience-based changes 640 (e.g., generated with reference to acted-upon proposals, or both). A higher bar can be set for ad-hoc changes 630 (e.g., more actions are required before they are considered to be accepted).

After such proposals 650 are generated, some 660 are acted upon, and some 665 are not. In practice, those that are acted upon 660 can be viewed positively (e.g., because they are used, edited, duplicated, or the like), and one or more elements 670 from such acted-upon proposals 660 can be used to influence future activity of the morpher 620. For example, the data context is re-used, the range is re-used, the selected attributes are reused, or the like.

Such re-use can comprise copying an element, modifying an element, systematically modifying an element (e.g., increasing by a percentage over plural iterations), or the like.

Similarly, a data context can be re-used, whether copied, augmented, deprecated, or the like. Those data contexts indicated as acted-upon can be weighted for further consideration compared to those that are not acted upon.

Although not shown in the drawing, not acted-upon proposals 665 can also influence the exception definition morpher 620. For example, those elements not acted upon can be negatively weighted for re-use or eliminated from consideration (e.g., for a period of time or the like).

As an example of re-use, variation of numerical reference values can start from the basis value as described above and use a stepwise approach (e.g., vary by 5%, 10%, etc.). In some embodiments, when varying multiple reference values, a variation distance (e.g., percentage of value variation, number of attributes considered, etc.) to already existing cases can be calculated and increased iteration by iteration. In some embodiments, the variation distance can be used to limit the number of iterations (e.g., the iteration can be terminated when the calculated variance distance reaches a predetermined threshold).

In some embodiments, the morphed new exception definitions can be tested with current logical object values and proposed as potential exceptions to the advanced users.

If the user selected and took action on the exception, it can indicate that the new exception definition has been accepted. If the new exception definition is accepted, it can be further tested a plurality of times with other logical objects and their respective reference values. In some embodiments, if the new exception definition has been accepted for a predefined number of instances, the new exception definition can be proposed for confirmation to an advanced user. In other embodiments, it also may be automatically confirmed.

In some embodiments, some existing exception definitions may be removed or proposed for removal if such exception definitions generate no instances of exceptions that lead to positive user reaction.

In some embodiments, instead of relying on user reaction described above, the system can work in the background to calculate plural exception instances for a new exception definition and detect if a user is taking action on one or more of the new exceptions. Although possible, the user need not provide explicit feedback—the user can simply identify business problems and resolve them to keep the business running without issues. Such detection (of a user taking action) can be achieved by tracking the user actions in the respective business applications and by monitoring attribute changes. If this has been detected for a predefined number of cases, then the above-mentioned advanced user will actively get the proposals.

Example 9—Example Acted-Upon Proposals

In any of the examples herein, the system can capture use and re-use of exception definitions to implement increasingly intelligent exception handling. Those proposed exception definitions that are not acted upon are typically weighted negatively or not weighted at all. For example, if a user ignores a proposed exception definition, it typically indicates that the definition is not helpful.

On the other hand, if the user acts upon the proposal, such action typically indicates that the definition was helpful, and further definitions that look like the proposed definition can be generated. The proposed exception definition, elements of the acted-upon proposal, or both can therefore be positively weighted for greater reuse.

Acted-upon proposals include those for which explicit feedback is provided (e.g., the user rates the proposal as accepted or approved, gives it a rating, or the like) as well as those for which implicit feedback is captured (e.g., the user copies, uses, shortlists, favorites, edits, shares, communicates the proposal, or the like). Also, if the user takes action (e.g., resolves the situation) via the proposal, the proposed exception definition can be considered acted upon. In other words, if a user takes action upon an exception generated by a proposed exception definition, the proposed exception definition can be considered as (e.g., categorized as) acted upon.

Acted-upon exception definition proposals can be limited to those categorized as such. For example, an explicit acceptance of the proposed exception definition can cause the proposal to be categorized as acted upon.

Similarly, a threshold can be set so that a certain number of actions is required before the proposed exception definition is considered to be (e.g., categorized as) acted upon. For example, if a particular user action type (e.g., resolving exceptions generated from the proposal) is detected for a predetermined number of times, the new exception definition can be categorized as acted upon for purposes of deriving a new exception definition. In practice, the threshold can be adjusted in response to observation of a value that tends to indicate that a proposal is accepted by a user. For example, responsive to receiving an explicit indication that a proposal is accepted, the number of times a particular user action type has been observed can be recorded and used to train a model that outputs a threshold number of times.

Example 10—Example Exception Definition Morphing Methods: Broadening and Sharpening Using one or more morphing methods, the exception definition morpher can derive new exception definitions from the original exception definitions. To illustrate the process, FIG. 7 shows an example diagram 700 depicting two morphing methods: broadening and sharpening.

Figure 7:
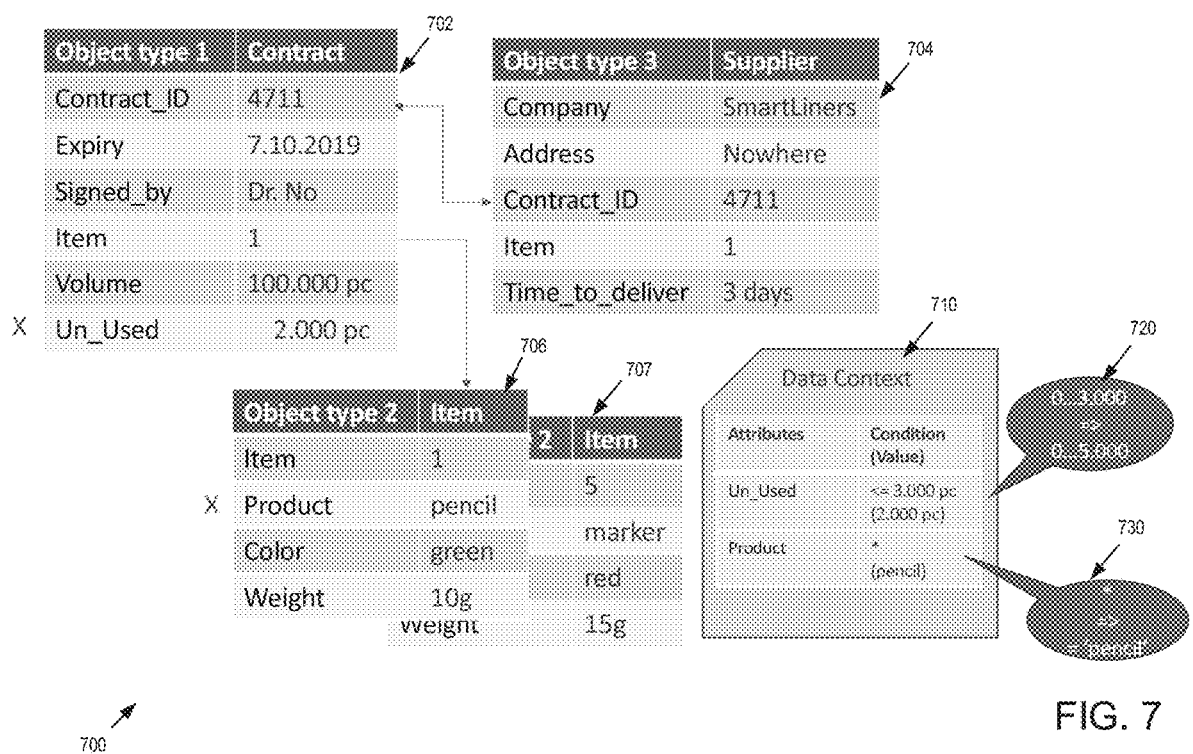
FIG. 7 is a diagram illustrating the concept of broadening and sharpening in generating new exception definitions.

FIG. 7 shows four logical objects: a contract object 702, a supplier object 704, and two item objects 706, 707. Each logical object, which is an instance of the corresponding logical object definition, includes a plurality of attribute names and the corresponding attribute values. In this example, the contract object definition is directly related to the supplier object definition through a shared attribute name "Contract_ID." In addition, the contract object definition, which includes the attribute name "Item," is directly linked to the item object definition.

FIG. 7 also shows a data context builder 710, which stores attribute names and corresponding attribute values, based on which situational trigger conditions in a query can be defined according to an exception definition. In this example, the original exception definition (i.e., predefined by a user) has a query that includes only one predefined situational trigger condition "Un_used⇐3,000 pc," which is satisfied whenever the volume of unused products in a contract object is less than or equal to 3,000 pieces. The only attribute name evaluated by the situational trigger condition included in the query (i.e., "Un_used") can be selected by the user from the contract object definition, which is also termed as a primary logical object definition. The reference value to which the attribute "Un_used" is compared (i.e., 3,000 pc), can be predefined by the user.

In this example, because the contract object 702 has 2,000 pieces of unused products, such contract object 702 would satisfy the predefined situational trigger condition. Thus, running the query defined in 710 against the logical objects would return all exceptions that satisfy the situational trigger condition "Un_used⇐3,000 pc," including the contract object 702.

One example embodiment of the morphing method is broadening 720, which can be used to expand the scope of any underlying query. The scope of a query described herein defines the extent or range of logical objects that would satisfy the situational trigger conditions included in the query. Thus, expanding the scope of a query defined in an exception definition could potentially increase the number of generated exceptions, whereas narrowing the scope of the query defined in the exception definition could potential decrease the number of generated exceptions.

In the illustrated example, the predefined situational trigger condition "Un_used⇐3,000 pc" is changed to a modified situational trigger condition "Un_used⇐5,000 pc." In other words, while the attribute name "Un_used" remains the same as the one selected from the primary logical object definition, the corresponding reference value is increased from 3,000 to 5,000. Thus, while the initial scope of the predefined query covers logical objects with unused products ranging from 0 to 3,000 pieces, the scope of the modified query is increased to cover logical objects with unused products ranging from 0 to 5,000 pieces.

While in this example, broadening is achieved by increasing the reference value (or threshold value) from 3,000 to 5,000, it should be understood that the reference values may be decreased (e.g., if the operator is "⇒" instead of "⇐") in some circumstances, or the reference value may be non-numeric in other circumstances (e.g., comparison of strings with wildcard characters). Broadening can be achieved so long as changing the reference value can increase the scope of the underlying query. Generally, broadening can potentially return new exceptions that the original query failed to uncover.

Another example embodiment of the morphing method is sharpening 730, which can be used to narrow the scope of the underlying query.

In the depicted example, the original situational trigger condition (i.e., "Un_used<=5,000 pc,") is not limited to any particular product. In other words, all types of product are eligible for such comparison. Thus, it implicitly states a second situational trigger condition "Product=*" that operates in conjunction with the original situational trigger condition "Un_used<=5,000 pc." In other words, the query returns all logical objects that satisfy both the first and second situational trigger conditions. Here, the attribute name "Product" in the second situational trigger condition is selected from the item object definition, and it is always satisfied (i.e., the wildcard character "*" indicates a match of any strings representing products).

In this example, the second situational trigger condition can be modified from "Product=*" to "Product=pencil." Thus, to satisfy the modified second situational trigger condition, the attribute name ("Product") of the logical objects must equal to the reference value "pencil." In other words, in contrast to the original query which would return logical objects with any types of unused products that are less than or equal to a threshold (e.g., 5,000), the modified query would only return logical objects with unused pencils that are less than or equal to the threshold. Thus, by placing more restrictive conditions, the scope of the modified query is reduced compared to the original query. Generally, sharpening can potentially reduce the number of returned exceptions, thus avoiding noise, distraction, and system resource waste.

While in this example, sharpening is achieved by changing the reference value from the wildcard character "*" to a particular string "pencil," it should be understood that the reference value can also be numerical, and sharpening can be achieved so long as changing the reference value can narrow the scope of the underlying query.

As described herein, for broadening and sharpening, the type of reference values used in comparisons can be categorical (e.g., "pencil," "paper," etc.), numerical, or the like.

If the type of reference value is categorical, the existing reference values in the system may be used as a basis for the proposed new reference values.

If the type of reference value is numerical, the proposed new reference values can start with the reference value already defined in the exception definitions as a basis.

For either categorical or numerical type of reference value, the respective basis can be selected from the exceptions which users have accepted and acted upon (i.e., the user confirmed such exceptions).

In some embodiments, adding additional attribute filters in conjunction with existing attribute filters (e.g., "AND") to the query can lead to sharpening. In some embodiments, extending the numerical reference values can lead to broadening. In some embodiments, adding additional reference values in disjunction with existing reference values (e.g., "OR") for one categorical attribute (e.g., "pencil" or "paper") can lead to broadening.

Example 11—Example Exception Definition Morphing Methods: Attribute Variation, Related Objects, Object Variation, and Resolution Reversal FIG. 8 shows an example diagram 800 depicting four additional morphing methods: attribute variation, related objects, object variation, and resolution reversal.

Figure 8:
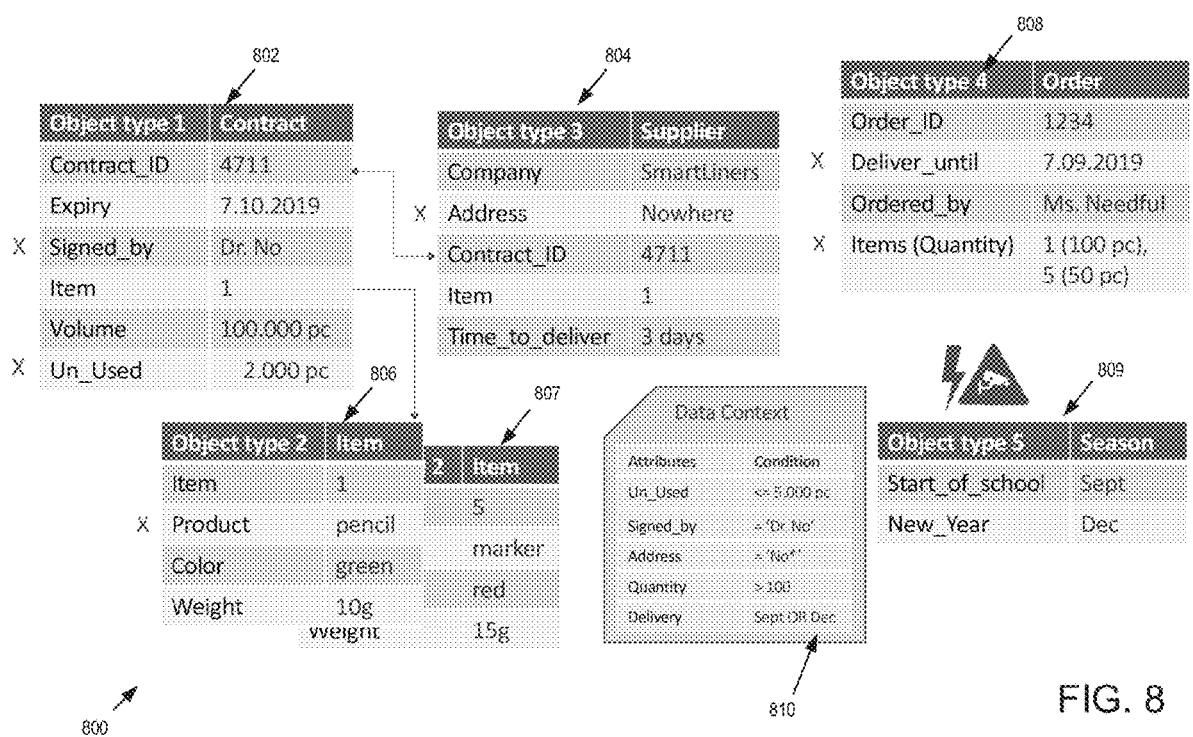
FIG. 8 is a diagram illustrating the concept of attribute variation, related objects, object variation, and resolution reversion in generating new exception definitions.

FIG. 8 shows six logical objects: a contract object 802, a supplier object 804, two item objects 806, 807, an order object 808, and a season object 809. Each logical object, which is an instance of the corresponding logical object definition, includes a plurality of attribute names and the corresponding attribute values. In this example, the contract object definition is directly related to the supplier object definition through a shared attribute name "Contract_ID." The contract object definition, which includes the attribute name "Item," is also directly linked to the item object definition. The order object definition and the season object definition, however, are not directly related to any of the contract object definition, the supplier object definition, and the item object definition (i.e., the order object definition does not share an identical attribute name with any other object definitions).

FIG. 8 also shows a data context builder 810, which stores all attribute names and corresponding attribute values, based on which situational trigger conditions in a query can be defined according to an exception definition. In this example, the original exception definition has a query that includes only one situational trigger condition "Un_used<=5,000 pc," which is satisfied whenever the volume of unused products in a contract object is less than or equal to 5,000 pieces. The only attribute name evaluated by the situational trigger condition included in the query (i.e., "Un_used") is selected from the contract object definition, which is the primary logical object definition. The reference value to which the attribute "Un_used" is compared (i.e., 5,000 pc) can be modified from a predefined value (e.g., 3,000 pc) by the broadening as described above.

According to an example embodiment, the attribute variation method can define a new situational trigger condition that operates in conjunction or disjunction with the original situational trigger condition. Specifically, the new situational trigger condition can be defined by selecting a second attribute of the primary logical object definition and determining a corresponding reference value to which the second attribute is compared.

For example, besides the original situational trigger condition (e.g., "Un_used<=5,000 pc"), a new situational trigger condition "Signed_by=Dr. No" can be specified by selecting the attribute name "Signed_by" from the contract object definition, choosing "Dr. No" as the corresponding reference value, and the equal sign "=" as the operator. The new situational trigger condition can operate in conjunction or disjunction with the original situational trigger condition. For example, the modified query can return the logical objects where either the original situational trigger condition or the new situational trigger condition (i.e., the contracts were signed by Dr. No) is satisfied. The generation of such exceptions can be valuable, for example, when special attention needs to be paid to those contracts that meet either situational trigger conditions.

According to an example embodiment, the related objects method can define a new situational trigger condition that operates in conjunction or disjunction with the original situational trigger condition. Specifically, the new situational trigger condition can be defined by selecting an attribute of a secondary logical object definition and determining a corresponding reference value to which the attribute is compared, wherein the secondary logical object definition is related directly to the primary logical object definition. As described herein, two logical object definitions are directly related to each other if they share at least one common attribute name.

For example, besides the original situational trigger condition (e.g., Un_used⇐5,000 pc"), a new situational trigger condition "Address=No*" can be specified by selecting an attribute "Address" from the supplier object definition which is directly related to the contract object definition, choosing "No*" as the reference value, and the equal sign "=" as the operator. The new situational trigger condition can operate in conjunction or disjunction with the original situational trigger condition. For example, the modified query can return all logical objects where either the original situational trigger condition or the new situational trigger condition (i.e., the supplier address starts with "No") is satisfied. The generation of such exceptions can be valuable, for example, when special attention needs to be paid to those contracts that either meet the original situational trigger condition or involve the suppliers with particular (e.g., suspicious or uncertain) addresses.

According to an example embodiment, the object variation method can define a new situational trigger condition that operates in conjunction or disjunction with the original situational trigger condition. Specifically, the new situational trigger condition can be defined by selecting an attribute of a secondary logical object definition and determining a corresponding reference value to which the attribute is compared, wherein the secondary logical object definition is not directly related to the primary logical object definition by any shared attribute. Instead, the attribute of the secondary logical object definition is semantically associated with at least one attribute of the primary logical object definition.

As described herein, the semantic association between attributes can be determined based on semantic analysis of the attribute names. In one example embodiment, two attribute names that respectively represent the singular and plural forms of a noun can be determined to be associated with each other. In another example embodiment, two attribute names that share a common substring can be determined to be associated with each other. In yet another embodiment, two attribute names that are synonyms according to a predefined dictionary can be determined to be associated with each other.

For example, besides the original situational trigger condition (e.g., Un_used⇐5,000 pc"), a new situational trigger condition "Quantity>100" can be specified by selecting an attribute "Items (Quantity)" from the order object definition which is not directly related to the contract object definition, choosing "100" as the reference value, and the larger sign ">" as the operator. The new situational trigger condition can operate in conjunction or disjunction with the original situational trigger condition. For example, the modified query can return all logical objects where either the original situational trigger condition or the new situational trigger condition (i.e., the quantity of items is greater than 100) is satisfied. The generation of such exceptions can be valuable, for example, when special attention needs to be paid to those contracts that either meet the original situational trigger condition or involve large volume orders (i.e., Quantity>100).

According to an example embodiment, the resolution reversal method can define a new situational trigger condition that operates in conjunction or disjunction with the original situational trigger condition. Specifically, the new situational trigger condition can be constructed using a backward analysis method involving the following steps: (a) receiving notifications when detecting satisfaction of a query against the logical objects; (b) monitoring user actions (or resolutions) taken in response to the notifications; (c) evaluating a correlation between the user actions and the notifications; and (d) specifying a comparison between a new attribute and a reference value corresponding to the new attribute based on evaluation of the correlation between the user actions and the notifications. In other words, the resolution reversal method evaluates the history of how previously detected exceptions are resolved and use the results of such evaluation to construct the new situational trigger condition.

For example, the resolution of a detected exception may be a notification and subsequent approval of a newly created contract by a dedicated operational purchaser. By run-time monitoring system's response to the detected exceptions, it may be revealed that the same resolution (e.g., event notification, approval status, and release of new contract) always occurs when order peaks during particular seasons (e.g., extra contracts are regularly created in September when a new school year starts or in December during the holiday season). Thus, a new situational trigger condition "Delivery=Sept OR Dec" can be constructed to capture this learned observation.

In some embodiments, the modified query can logically combine any of the situational trigger conditions (either original or newly created using any of the morphing methods) using any of the logical operators, such as AND, OR, NOT, etc.

Example 12—Example Application of the Morphing Methods

As described above, any of the exception definition morphing methods—broadening, sharpening, attribute variation, related objects, object variation, and resolution reversal—can be applied to derive new exception definitions from the original exception definition.

In one embodiment, the exception definition morpher can implement only the broadening method to simply increase the scope of the underlying query and detect more exceptions. In other embodiments, the exception definition morpher can combine the broadening method with one or more other morphing methods (e.g., sharpening, attribute variation, etc.) to create new exception definitions that have completely different structures than the original exception definition so as to redefine the scope of the underlying query and detect previously overlooked situations.

In defining new situational trigger conditions, the exception definition morpher can be configured to automatically select the attribute name and the corresponding reference value. While theoretically it is possible for the exception definition morpher to define new situational trigger conditions by permuting all attributes specified in all logical object definitions, such exhaustive permutation can consume too much computing resources. Instead of randomly choosing any permutation of attribute and reference values, new exception definitions can be generated based on original exception definitions, thus limiting the scope of permutation.

For example, in some embodiments, the exception definition morpher can define new situational trigger conditions by limiting the permutation of attributes in selected logical object definitions.

In some embodiments, the limitation of attribute permutation may be specified by a predefined distance measure, which measures the deviation of the new situation trigger condition from the original situational trigger condition. For example, in the example shown in FIG. 8, the new situational trigger condition "Signed_by=Dr. No" defined by the attribute variation method can be assigned a distance 1, whereas the new situational trigger condition "Address=No*" defined by the related objects method can be assigned a distance 2, because the attribute name "Signed_by" is selected from the primary object definition and the attribute name "Address" is selected from the secondary object definition.

Example 13—Example Advantages

A number of advantages can be achieved via the technology described herein. For example, by applying one or more of the morphing methods noted above, the described technologies can derive new exception definitions from the user-defined original exception definition, and these new exception definitions can be generated automatically without laborious user definition process. Such new exceptions definitions can detect new exceptions that may have been overlooked by the original exception definition. Detecting such new exceptions allow users of the ERP system to timely respond to the revealed situations and proactively mitigate risks associated with such situations.

Although examples show application of the technologies to business scenarios, the technology can also be applied to other technical use cases, such as detecting, predicting, and resolving memory peaks, load spikes, processor power shortage, input/output issues, network traffic exceptions, or the like.

Further, the generated new exception definitions can be ranked, optimized and improved over time by run time monitoring and user feedback.

By monitoring the resource consumption associated with the exception detection and evaluating a power user's feedback in response to the detected exceptions, the exception handling system can incorporate machine learning algorithms to further improve the exception definition process so that the need for user feedback is reduced and only meaningful and actionable exceptions are detected. As a result, fewer computing resources and hardware are ultimately required while improving the overall performance of the system in detecting exceptions.

Example 14—Example Computing Systems

Figure 9:
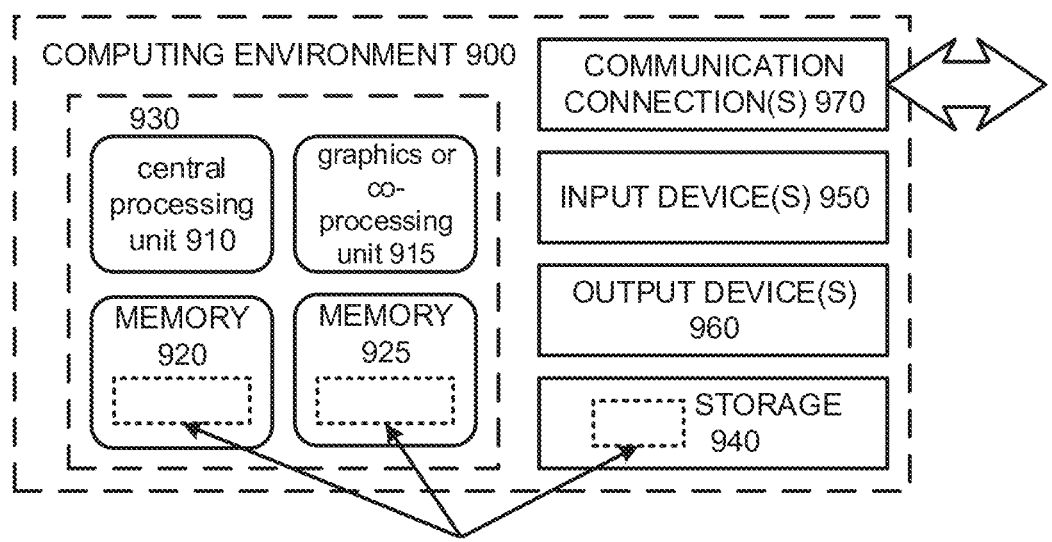
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 can have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 280 implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 15—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 16—Example Cloud Computing Environment

Figure 10:
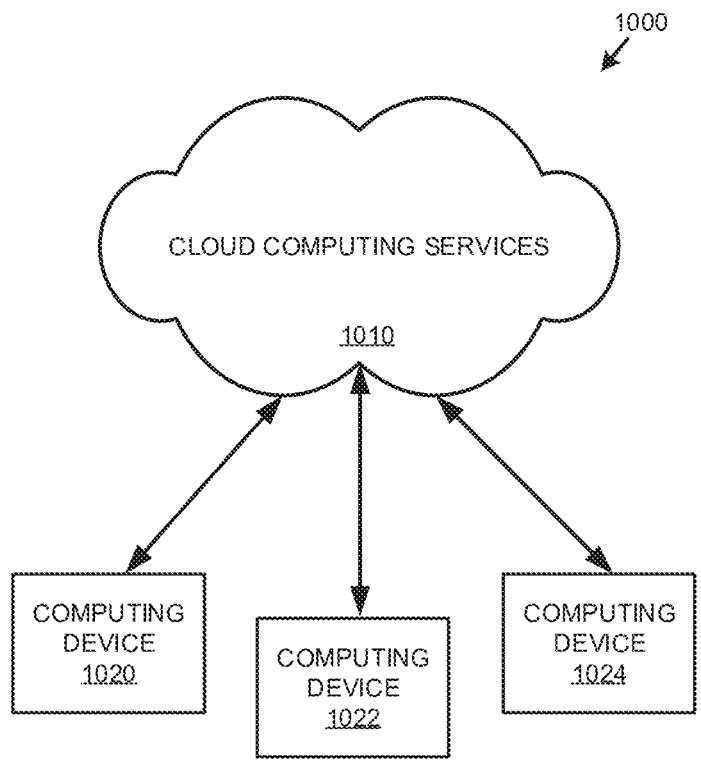
FIG. 10 is a block diagram of an example cloud computing environment that can be used in conjunction with the technologies described herein.

FIG. 10 depicts an example cloud computing environment 1000 in which the described technologies can be implemented, including, e.g., the system disclosed above and other systems herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1023. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example 17—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 18—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
in a database environment comprising a plurality of logical object definitions having relationships defined according to a schema and logical object instances following the logical object definitions, wherein the logical object instances comprise attribute names and respective attribute values indicating status of an enterprise in an enterprise resource planning system, receiving a starting exception definition specifying a first query against the logical object instances, wherein the first query comprises one or more initial situational trigger conditions;
automatically deriving a new exception definition based on the starting exception definition and one or more stored, acted-upon exception definition proposals, wherein the new exception definition specifies a second query against the logical object instances, wherein the second query comprises one or more modified situational trigger conditions; and
automatically applying the new exception definition to the logical object instances in the database environment to detect exceptions, wherein the applying comprises running the second query against the logical object instances, wherein the exceptions are logical object instances that satisfy the one or more modified situational trigger conditions.

2. The method of claim 1, further comprising detecting a user action in response to at least one detected exception, and designating the new exception definition as an acted-upon exception definition proposal when the user action is detected for a predetermined number of times.

3. The method of claim 1, wherein deriving the new exception definition comprises re-using a data context associated with at least one of the one or more stored, acted-upon exception definition proposals, wherein the data context comprises attribute names and attribute values corresponding to the attribute names.

4. The method of claim 3, wherein re-using the data context comprises copying or modifying at least one of the attribute names or attribute values.

5. The method of claim 1, wherein the one or more initial situational trigger conditions in the first query comprise an original first situational trigger condition that specifies a comparison between a first attribute of a primary logical object definition and an original first reference value, wherein the primary logical object definition is one of the plurality of logical object definitions in the database environment.

6. The method of claim 5, wherein deriving the new exception definition comprises changing the original first situational trigger condition to a modified first situational trigger condition which specifies a comparison between the first attribute of the primary logical object definition and a modified first reference value;
wherein the original first reference value defines an initial scope of the first attribute, the modified first reference value defines a modified scope of the first attribute, and wherein the modified scope of the first attribute is broader than the initial scope of the first attribute.

7. The method of claim 6, wherein the one or more modified situational trigger conditions in the first query comprise an original second situational trigger condition that operates in conjunction with the original first situational trigger condition, wherein the original second situational trigger condition specifies a comparison between a second attribute selected from the plurality of logical object definitions and an original second reference value;

wherein deriving the new exception definition comprises changing the original second situational trigger condition to a modified second situational trigger condition which specifies a comparison between the second attribute and a modified second reference value;

wherein the original second reference value defines an initial scope of the second attribute, the modified second reference value defines a modified scope of the second attribute, and wherein the initial scope of the second attribute is broader than the modified scope of the second attribute.

8. The method of claim 6, wherein deriving the new exception definition comprises defining a second situational trigger condition that operates in conjunction with the modified first situational trigger condition;

wherein defining the second situational trigger condition comprises selecting a second attribute of the primary logical object definition and determining a second reference value to which the second attribute is compared.

9. The method of claim 6, wherein deriving the new exception definition comprises defining a second situational trigger condition that operates in conjunction with the modified first situational trigger condition;

wherein defining the second situational trigger condition comprises selecting an attribute of a secondary logical object definition and determining a second reference value to which the attribute is compared;

wherein the secondary logical object definition is directly related to the primary logical object definition by at least one shared attribute.

10. The method of claim 6, wherein deriving the new exception definition comprises defining a second situational trigger condition that operates in conjunction with the modified first situational trigger condition;

wherein defining the second situational trigger condition comprises selecting an attribute of a secondary logical object definition and determining a second reference value to which the attribute is compared;

wherein the secondary logical object definition is not directly related to the primary logical object definition by any shared attribute;

wherein the attribute of the secondary logical object definition is semantically associated with at least one attribute of the primary logical object definition.

11. The method of claim 1, further comprising:

responsive to detecting satisfaction of the second query against the logical object instances, sending a message from a first computer to a second computer indicating that the one or more modified situational trigger conditions have been met.

12. A system comprising:

one or more processors; and memory coupled to the one or more processors comprising instructions causing the one or more processors to perform a method comprising:

in a computing environment comprising a plurality of logical object definitions having relationships defined according to a schema and logical object instances following the logical object definitions, wherein the logical object instances comprise attribute names and respective attribute values indicating status of an enterprise in an enterprise resource planning system, receiving a starting exception definition specifying a first query against the logical object instances, wherein the first query comprises one or more initial situational trigger conditions;

automatically deriving a new exception definition based on the starting exception definition and one or more stored, acted-upon exception definition proposals, wherein the new exception definition specifies a second query against the logical object instances, wherein the second query comprises one or more modified situational trigger conditions; and automatically applying the new exception definition to the logical object instances in the database environment to detect exceptions, wherein the applying comprises running the second query against the logical object instances, wherein the exceptions are logical object instances that satisfy the one or more modified situational trigger conditions.

13. The system of claim 12, wherein the method further comprises detecting a user action in response to at least one detected exception, and designating the new exception definition as an acted-upon exception definition proposal when the user action is detected for a predetermined number of times.

14. The system of claim 12, wherein deriving the new exception definition comprises re-using a data context associated with at least one of the one or more stored, acted-upon exception definition proposals, wherein the data context comprises attribute names and attribute values corresponding to the attribute names.

15. The system of claim 12, wherein the one or more initial situational trigger conditions in the first query comprise an original first situational trigger condition that specifies a comparison between a first attribute of a primary logical object definition and an original first reference value, wherein the primary logical object definition is one of the plurality of logical object definitions in the computing environment.

16. The system of claim 15, wherein deriving the new exception definition comprises changing the original first situational trigger condition to a modified first situational trigger condition which specifies a comparison between the first attribute of the primary logical object definition and a modified first reference value;

wherein the original first reference value defines an initial scope of the first attribute, the modified first reference value defines a modified scope of the first attribute, and wherein the modified scope of the first attribute is broader than the initial scope of the first attribute.

17. The system of claim 16, wherein the one or more modified situational trigger conditions in the first query comprise an original second situational trigger condition that operates in conjunction with the original first situational trigger condition, wherein the original second situational trigger condition specifies a comparison between a second attribute selected from the plurality of logical object definitions and an original second reference value;

wherein deriving the new exception definition comprises changing the original second situational trigger condition to a modified second situational trigger condition which specifies a comparison between the second attribute and a modified second reference value;

wherein the original second reference value defines an initial scope of the second attribute, the modified second reference value defines a modified scope of the second attribute, and wherein the initial scope of the second attribute is broader than the modified scope of the second attribute.

18. The system of claim 16, wherein deriving the new exception definition comprises defining a second situational trigger condition that operates in conjunction with the modified first situational trigger condition;

wherein defining the second situational trigger condition comprises selecting a second attribute of the primary logical object definition and determining a second reference value to which the second attribute is compared.

19. The system of claim 12, wherein the method further comprises:

responsive to detecting satisfaction of the second query against the logical object instances, sending a message from a first computer to a second computer indicating that the one or more modified situational trigger conditions have been met.

20. One or more computer-readable media having encoded thereon computer-executable instructions that, when executed, cause one or more processors to perform a method comprising:

in a database environment comprising a plurality of logical object definitions having relationships defined according to a schema and logical object instances following the logical object definitions comprise attribute names and respective attribute values indicating status of an enterprise in an enterprise resource planning system, receiving a starting exception definition specifying a first query against the logical object instances, wherein the first query comprises one or more initial situational trigger conditions;

automatically deriving a new exception definition based on the starting exception definition and one or more stored, acted-upon exception definition proposals, wherein the new exception definition specifies a second query against the logical object instances, wherein the second query comprises one or more modified situational trigger conditions;

automatically applying the new exception definition to the logical object instances in the database environment to detect exceptions, wherein the applying comprises running the second query against the logical object instances, wherein the exceptions are logical object instances that satisfy the one or more modified situational trigger conditions;

detecting a user action in response to at least one detected exception, and designating the new exception definition as an acted-upon exception definition proposal when the user action is detected for a predetermined number of times; and responsive to detecting satisfaction of the second query against the logical object instances, sending a message from a first computer to a second computer indicating that the one or more modified situational trigger conditions have been met.

* * * * *